R. G. GOLDMAN.
ROLLER BEARING.
APPLICATION FILED DEC. 19, 1917.
1,286,289.
Patented Dec. 3, 1918.
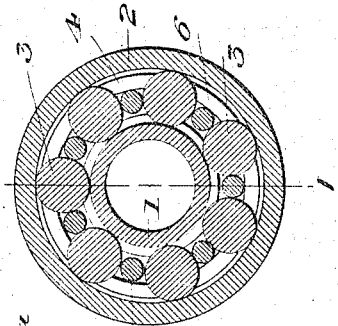
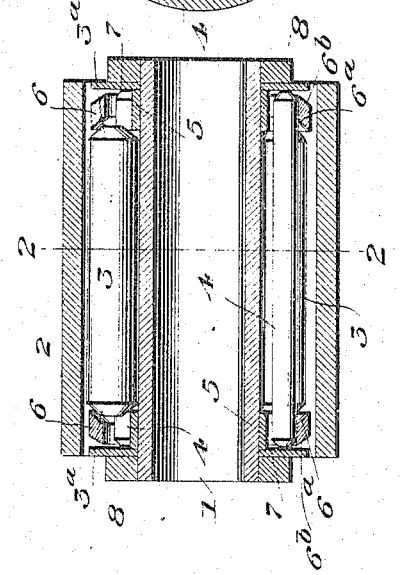

UNITED STATES PATENT OFFICE.

RUTHERFORD G. GOLDMAN, OF LOS ANGELES, CALIFORNIA.

ROLLER-BEARING.

1,286,289.    Specification of Letters Patent.    Patented Dec. 3, 1918.

Application filed December 19, 1917. Serial No. 207,931.

*To all whom it may concern:*

Be it known that I, RUTHERFORD G. GOLDMAN, a citizen of the United States, residing at Los Angeles, in the county of Los Angeles and State of California, have invented certain new and useful Improvements in Roller-Bearings, of which the following is a specification.

My invention relates to an improvement in roller bearings, and it comprises means for maintaining the assembly of the rollers even when the outer sleeve is removed, while at the same time it provides for a minimum of friction in all contacting parts, both the bearing and spacing rollers and the single retaining ring being adapted to travel, the latter being of the floating type, and so constructed in cross sectional form that its contact with any engaging part of the bearing is reduced to a minimum, it at the same time being all-embracing in its function of holding the rollers together, and preventing their falling out of place when the outer sleeve is removed.

My present invention comprises an inner and outer sleeve, having an annular space therebetween, which is filled with bearing and spacing rollers alternately arranged, all of which rollers terminate in a truncated cone formation, the spacing rollers being of greater length than the bearing rollers, a retaining ring approximately rhomboidal in cross section and of the float type receiving the ends of the spacing rollers therein and slightly overhanging at their inner ends the conical formation at the ends of the bearing rollers, with rings and washers at the ends of the bearing.

In the accompanying drawing:—

Figure 1 is a longitudinal section on the line 1—1 of Fig. 2; and

Fig. 2 is a transverse section on the line 2—2 of Fig. 1.

1 and 2 represent cylindrical inner and outer sleeves, the former being of somewhat greater length than the latter and preferably protruding somewhat therebeyond at either end, with an annular space between the two.

Bearing rollers 3 of large diameter, and spacing rollers 4 interposed therebetween are located within this annular space between the sleeves 1 and 2. The bearing rollers have tapering truncated cone-shaped ends 3ª, and the spacing rollers similar ends 4ª, the bearing rollers 3 of less length than the spacing rollers.

Retaining rings 6 are approximately rhomboidal in cross section, and they form a floating circular track for the ends of the spacing rollers, they being left free to rotate with these rollers. Being rhomboidal in cross-section, they present a sharp angle at either end, where they engage or may engage in turning the end washers 7 and the conical ends 3ª of the bearing rollers, the inner edge 6ª constituting an overhang for this purpose and preventing the rollers from falling apart or out of place when the outer sleeve 2 is removed.

The end thrust of the bearing rollers is received on the sharp angular inner ends of the rings 5, thus presenting a very slight contact surface, thereby eliminating friction or reducing it to a minimum.

The end thrust on the spacing rollers is received on the washer 7, but since the ends of these spacing rollers are reduced nearly to a point, there is left but very little surface exposed to friction.

The entire bearing is held together by rings 8 at the extreme ends, which are shrunk, screwed, or otherwise secured to the protruding ends of the inner sleeve 1.

I claim:

1. A roller bearing comprising inner and outer sleeves having an annular space therebetween, bearing rollers and spacing rollers alternately arranged and located in said annular space, the spacing rollers of less diameter and greater length than the bearing rollers, and the inner sleeve of greater length than the outer sleeve, two rings and two washers at each end, one ring taking the end thrust of the bearing rollers and the other a floating ring forming a track for the spacing rollers, and the inner washers taking the end thrust of said spacing rollers, the outer washers secured to the protruding ends of the inner sleeve for retaining said parts within the annular space between the sleeves.

2. A roller bearing comprising inner and outer sleeves having an annular space therebetween, bearing and spacing rollers alternately arranged in said annular space, the spacing rollers of smaller diameter and greater length than the bearing rollers, all of the rollers having a conical formation at their ends, retaining rings rhomboidal in cross-section forming a track for the ends of the spacing rollers and presenting an overhang for the conical ends of the bearing rollers, rings which present a sharp angle which receives the end thrust of the bearing rollers, and end washers which receive the end thrust of the spacing rollers.

In testimony whereof I affix my signature.

RUTHERFORD G. GOLDMAN.